Patented Feb. 19, 1935

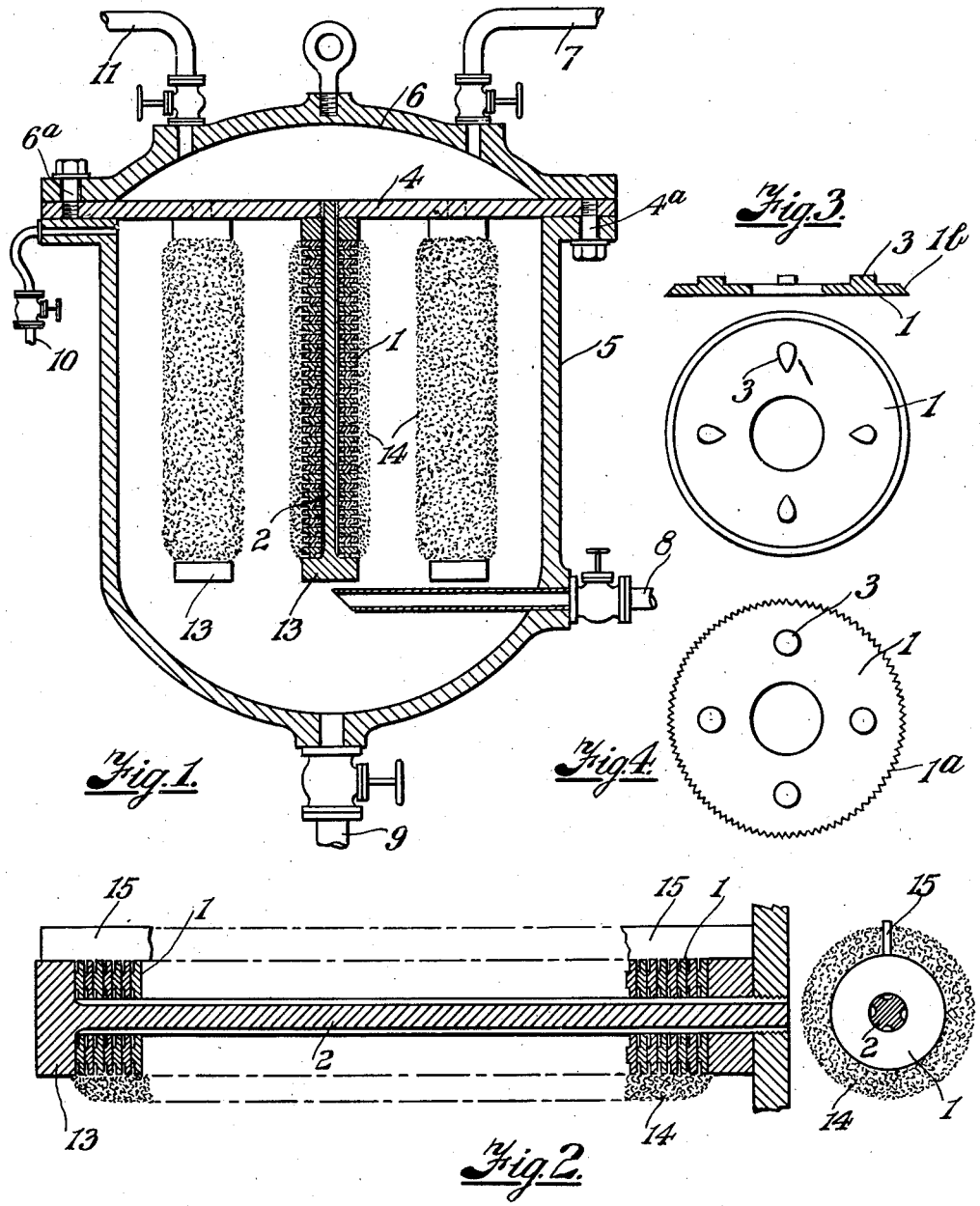

1,992,101

UNITED STATES PATENT OFFICE 1,992,101

FILTER

Leslie Donald Stuart, Bromley, England

Application February 17, 1932, Serial No. 593,622
In Great Britain July 17, 1931

3 Claims. (Cl. 210—165)

This invention relates to filters of the kind in which the filter structure is composed of a number of metal plates arranged in a pile or similar assembly so as to form a number of slot-like openings or passages which permit liquids to pass but which provide a lodgment for suspended matter.

Filters of this type depend for their successful operation upon the formation on the leaves or plates of a coating or filter cake by passing a suspension of suitable solid matter through the filter until the solid matter caught by the leaves or plates has produced a porous cake of solid particles more or less permanently lodged on or in the leaves and of sufficient thickness to catch the impurities which are to be separated from a liquid by the subsequent use of the filter. For this purpose the liquid to be filtered is usually mixed with kieselguhr or other "filter aid" having particles which are sufficiently bulky to enable a stable cake to be built up upon the metal leaves or plates.

In the use of known filters of the type referred to a number of practical difficulties have been encountered both in the process of building up the cake and in the periodic process of cleaning off the used cake prior to the formation of a fresh cake. In particular it is generally found that attempts to clean off the cake from known filters by means of a small quantity of back flushing fluid results in sporadic detachment of the cake, leaving areas denuded of cake through which cleaning medium escapes without affecting the unstripped areas. In addition the parts of the filter nearest the point of entry of the backflushing fluid tend to become cleansed at the expense of the more remote parts and this effect is cumulative during successive cycles of operation to an extent commonly necessitating the complete disintegration and reconstitution of the filter.

The difficulties referred to above are of particular importance in cases where:

(a) The normal throughput of a filter between cleaning intervals is comparatively small.

(b) Losses of prefilt or of filtrate or other liquid used for back flushing by contamination with removed matter during filter cleaning are objectionable by reason of high value and (c) A predetermined steady output must be maintained to avoid disturbance of flow.

The object of the present invention is to improve the construction and operation of filters of the kind referred to which will overcome the difficulties above mentioned and will enable a large number of successive operations to be carried out with a minimum of attention, without undue loss of output and efficiency, and without the use of excessive quantities of liquid during cleaning.

The principal improvement according to the invention consists in assembling the metal plates on a suitable support with the individual plates held rigidly in predetermined space relationship in such a manner as to form a series of slot-like drainage passages of capillary dimensions.

A further improvement which is of value in certain cases consists in roughening, scoring or serrating the filter bed supporting edges of the metal plates in such a way as to promote the retention of the filter bed or coating during idle periods and during the removal of prefilt from the filter container prior to cleaning. Alternatively, the edges of the metal leaves or plates may be chamfered so that the surface of the filter structure represents a saw edge appearance which may be arranged so as to assist or impede the discharge of cake. There may be different chamfers at different parts of the filter structure so as to assist in controlling the effective removal of the cake.

It is of great practical importance to support the metal leaves or plates rigidly and in predetermined spaced relationship so as to form drainage passages which are of capillary dimensions and which are of substantial length in the direction of fluid flow, the length of the passage in this direction being at least 100 times the spacing between the plates. The back pressure through the capillary drainage spaces prevents an undue flow of liquid through the filter at any one region during back flushing and the consequent distribution of flow during back flushing prevents the premature stripping of isolated areas and ensures complete removal of the coating or filter bed with the use of a minimum quantity of cleaning or flushing liquid. The shearing resistance of the capillary films in conjunction with the mechanical properties of the arch structures of interlocked particles which are formed at the edges of the metal plates or leaves also operates to retain the cake in position during standby periods and during the operation of draining a filter, especially when the liquid filtered is of a viscous nature and adequately wets the particles of filter aid. The degree of adhesion may be varied by modifying the dimensions of the leaves or plates and the step of roughening, scoring, serrating or chamfering the edges may be resorted to as previously stated to increase the adhesion when necessary.

In carrying the invention into effect according to the preferred form the metal leaves or plates are assembled on a slotted rod or tubular support which passes through holes or openings in the plates or leaves and provides a drainage way for liquid flowing through the space between the plates or leaves radially towards the rod or tube. The plates or leaves are clamped longitudinally in the direction of the rod or tube and are spaced apart by suitable distance pieces interposed between the individual plates, the said distance pieces being of uniform dimensions so that the distance between laminæ is substantially uniform and the spacing between the laminæ presents areas of substantial unvarying cross section.

The plates or leaves may be of circular or rectangular form and the distance pieces are preferably constituted by lugs or projections formed integrally on one or both surfaces of each plate.

In order that the invention may be readily understood two examples of filters constructed in accordance with the invention are illustrated in the accompanying drawing in which:—

Figure 1 is a vertical section through a filter suitable for filtering oil or varnish.

Figure 2 is a longitudinal, transverse sectional view of a modified form of filter in which the leaf or plate piles are disposed horizontally and, Figures 3 and 4 are detail views showing two forms of metal leaves or plates.

Referring to Figure 1 of the drawing the filter shown consists of a plurality of metal leaf or edge filter units, each of which is composed of a series of mild steel plates 1 threaded on a slotted rod 2 and spaced apart from one another by projections 3 (see Figures 3 and 4) which are formed on the faces of the plates 1.

The rods 2 are screwed into openings in a plate 4 which forms a lid or cover fitted to the open mouth of a container 5 in such way that when the plate 4 is in position on the mouth of the container the filter units depend vertically from the plate 4 within the container 5.

A cover 6 is adapted to be fitted upon the mouth of the container above the plate 4 so as to form between the plate 4 and cover 6 a chamber into which clear filtrate flows through the slots in the rods 2 and from which the clear filtrate is delivered at an outlet 7. A valve controlled inlet 8 for prefilt is provided near the lower end of the container 5 and in addition a draining opening 9 and two valve controlled inlets 10 and 11 for compressed air or other pressure fluid leading into the container 5 and the space between the plate 4 and cover 6 respectively, are provided.

The plate 4 is bolted to the mouth of the container 5 by means of studs 4a and the cover 6 is bolted to the plate 4 by means of studs 6a in such manner that after the nuts have been removed from the studs 4a the cover 6 together with the plate 4 carrying the filter leaves can be removed from the container 5 as a unit without loss of filtrate from the chamber formed between the plate 4 and cover 6. The cover 6 and plate 4 therefore constitute a header into which the filter leaves are set as a unit which can be removed bodily from the filter container without opening the header.

The plates 1 are clamped longitudinally between the plate 4 and a head 13 formed on the rod 2 and the individual plates are spaced from one another by the projections 3 formed on the faces of the plates.

In the preferred construction and as shown in Figs. 3 and 4, each plate 1 has four projections 3 on the face thereof. The ideal form of these projections is the streamline shape illustrated in Fig. 3 but in practice the circular form illustrated in Fig. 4 is satisfactory for filtration at rates less than twenty gallons per square foot per hour and has obvious advantages in cheapening the cost of dies or press tools.

In Figure 4 of the drawing I have shown the plate 1 serrated at its outer edge (as indicated at 1a) for the purpose of increasing the adhesion of the cake. The edges of all the plates 1 may be serrated in this way or may be roughened or scored.

Alternatively the edges of the plates may be chamfered as shown at 1b in Figure 3. Some or all of the plates 1 may be chamfered for the purpose of controlling the adhesion of the cake as hereinbefore explained.

In the operation of the filter shown in Fig. 1, the filter units are precoated by passing therethrough a suspension of filter aid in such manner that a cake or coating is formed upon the outer edges of the plates 1 by deposition of filter aid from the suspension. This cake which is illustrated at 14 in Fig. 1 is formed on and not in the leaves as owing to the unvarying spacing between the plates 1 any matter which passes the edges of the plates is carried smoothly forward without lodging between the plates. In order to facilitate the initial formation of this bed it is preferred to start the operation with a relatively concentrated suspension of filter aid and subsequently to reduce the proportion of filter aid to liquid during completion of the process of forming the filter coating or cake.

I have found that with many liquids the presentation of a filter aid suspension of one concentration to one of another concentration results in stratification in the container due to interfacial tension between the suspensions of different concentrations and this stratification results in uneven coating of the filter plates and is detrimental to the formation of a coating of filter aid. In operating a filter in accordance with my invention therefore, I prefer to reduce the concentration of the filter aid suspension gradually during the process of forming the cake. In the case of a filter for oil varnish having a viscosity of from 40–50% of that of glycerol and employing as the filter aid calcined kieselguhr having a bulk density in water of 0.20–0.30 gram per millilitre and an intrinsic water rate of 300–600 gallons per square foot per hour at 10 lbs. pressure for a layer of 0.25 pound per square foot, an initial concentration of suspended filter aid of 5% may be employed. This suspension of filter aid is introduced into the container 5 through the prefilt inlet 8 and is forced through the filter at a predetermined rate until the filtrate issuing from the outlet 7 becomes clear, thus showing that the initial coating or filter bed has been formed.

After this point has been reached the suspension of filter aid is progressively diluted until the filter aid content of the liquid has reached a value suitable for prolonged running. In the example given the final concentration of the filter aid would be from 0.25% to 0.50% and the period of running during gradual dilution would be adjusted so that the coating on the leaves would finally attain a density of from 0.1 to 0.2 pound per square foot.

When this point has been reached, prefilt containing suspended filter aid in the requisite proportion is admitted to the container 5 and the filter is operated at a constant rate until the filtration pressure rises to a predetermined figure e. g. about 120 pounds per square inch.

When the limit of pressure is reached the inlet 8 and outlet 7 are closed and the prefilt remaining in the container 5 is conserved by draining out through the draining opening 9. Compressed air or gas may be admitted through the inlet 10 to assist in the draining operation. The cover 6 is now removed and the plate 4 carrying the filter piles is lifted out of the container 5 with the filter cake still adhering thereto and is moved into a position over a suitable receptacle. Compressed air or gas is then admitted to the space between the plate 4 and the cover 6 through the inlet 11 so as to force liquid through the capillary spaces between the plates 1, thereby loosening the cake or filter bed adhering to the edges of the plates 1. The cake then slides progressively down the piles of plates 1 and falls into the receptacle. The air pressure may be varied from time to time to ensure proper removal of the cake and if necessary a fluctuating pressure may be used to cause the cake to "breathe" and expand to admit lubricating fluid to the bed from a suitable lubricant container (not shown) so as to assist in the removal of the cake.

The above series of operations consisting in (1) the formation of the filter cake, (2) the filtering process (3) draining of the container 5 and (4) the removal of the filter bed constitutes a complete cycle and may of course be repeated as many times as desired.

For the proper operation of the filter as above described a constant rate of flow during filtering is preferable. The filter coating formed by the process and as set out above will have a pore space occupied by liquid to a volume greater than 50%. The bed will therefore behave as a viscous liquid rather than as a plastic solid. An increase of the rate of flow during the filtering is undesirable because it tends to force material through the filter cake, whilst any decrease in the rate of flow releases the supporting hydraulic pressure on the cake.

The increase of pressure during operation at constant rate constitutes only an increase in load on the solid components of the bed and is not deleterious provided that the pressure is kept below a limit determined by the ultimate strength of the arches formed by the filter aid on the edges of the plates. This ultimate strength is of the order of 150 pounds per square inch when the spacing between the plate 1 is 0.0015 inch.

In some cases it will be desirable to arrange the filter units horizontally instead of vertically as shown in Figure 1. Figure 2 of the drawing illustrates in longitudinal and transverse section a portion of a filter carrying a horizontally disposed filter unit which is similar in construction to the vertical filter unit shown in Figure 1.

The general construction and mode of use of a filter provided with horizontal filter units as shown in Figure 2 is the same as that of the filter shown in Figure 1 and it is found that the cake is usually well retained on horizontally disposed filter units during the operation of draining the filter, but some difficulty may be experienced in the proper removal of the cake when horizontally disposed units are employed.

In order to overcome the difficulty it is preferred, when horizontal filter units are employed, to attach to or mount adjacent to each horizontal unit a longitudinal member or fin 15 (see Figure 2) disposed above the filter unit and in contact with the edges of the plates 1 in such a way as to divide the cake formed on the edges of the plates 1 as illustrated in Figure 2. Owing to the presence of this longitudinal member or fin 15 the cake 14 is of C-shape in cross section instead of being in the form of a continuous cylinder surrounding the filter unit. By reason of this discontinuity of the cake, when the operation of cleaning off the cake is performed in the same way as described with reference to Figure 1, the cake splits and unrolls and is therefore readily discharged.

It will be appreciated that the invention is applicable to both pressure and vacuum filters, it being immaterial what means are adopted to produce the necessary pressure drop through the filter structure when filtering is in progress. When the filter is fed from a pressure container, which may or may not be integral with the container 5, a progressively diluted suspension of filter aid is fed into the pressure container through an opening near the bottom thereof as described with reference to Figure 1 and the mixing of prefilt with filter aid is effected before and not after the transfer of the prefilt and filter aid into the pressure vessel.

In cases where the filter aid tends to settle relatively rapidly so that sedimentation within the container would occur, resort may be had to the known expedient of rotating the filter structure for the purpose of agitating the mixture in the filter container.

I claim:—

1. In a filter of the kind described, a plurality of metal plates arranged in the form of a pile to present slit-like openings between their outer edges, and a bed of filter aid on the outer edges of said plates, the outer edges of said plates having irregularities for assisting in the retention of said bed of filter aid thereon.

2. A filter of the kind described having prefilt and filtrate chambers, a plate member dividing said chambers having an opening therethrough, the wall defining said opening having screw threads thereon, a rod having screw threads engaging the first mentioned screw threads, a head on said rod, and a plurality of plates piled on said rod between said head and plate member forming a plurality of passageways of capillary dimensions, the outer edges of said plates having irregularities to assist in retaining a bed of filter aid thereon, and said rod having a longitudinal slot in its periphery in communication with said passageways and both chambers.

3. A filter of the kind described having a prefilt chamber, a plate member over said chamber, a cover over said plate member providing a filtrate chamber between it and said plate member, said plate member having a plurality of openings therethrough, the walls defining said openings having screw threads thereon, rods having screw threads engaging the first mentioned screw threads, heads on the rods, a plurality of plates piled on each rod between said heads and plate member forming a plurality of passages of capillary dimensions, the outer edges of said plates having irregularities to assist in retaining a bed of filter aid thereon, and said rods having longitudinal slots in their peripheries in communication with said passageways and both chambers, a filtrate outlet valve on said cover, and inlet means for the prefilt chamber.

LESLIE DONALD STUART.